(No Model.)

E. ROTH.
SAW FILING MACHINE.

No. 268,940. Patented Dec. 12, 1882.

WITNESSES:

INVENTOR:
E. Roth

BY
Munn & Co
ATTORNEYS.

UNITED STATES PATENT OFFICE.

ELIAS ROTH, OF NEW OXFORD, PENNSYLVANIA.

SAW-FILING MACHINE.

SPECIFICATION forming part of Letters Patent No. 268,940, dated December 12, 1882.

Application filed July 8, 1882. (No model.)

To all whom it may concern:

Be it known that I, ELIAS ROTH, of New Oxford, in the county of Adams and State of Pennsylvania, have invented a new and Improved Saw-Filing Machine, of which the following is a full, clear, and exact description.

My invention relates to improvements in a saw-filing machine for which I obtained Letters Patent February 22, 1876, No. 173,866, the object being to provide for more accurately guiding and adjusting the file during the operation of filing saws, so that the teeth shall all be filed to a uniform level and pitch, and so that the action of the file will be equal to its full length. Further, the object is to provide for setting the file—either three-cornered, flat, or half-round—by a gage that shall secure accuracy in the operation of the file.

The invention consists in a frame carrying the file, fitted to slide in a clamp in which the file-frame is adjusted to vary the level and pitch of the teeth.

It also consists in a movable gage for adjusting the file with reference to the teeth, and in certain other features, as hereinafter described and claimed.

Reference is to be had to the accompanying drawings, forming a part of this specification, in which similar letters of reference indicate corresponding parts in all the figures.

Figure 1:
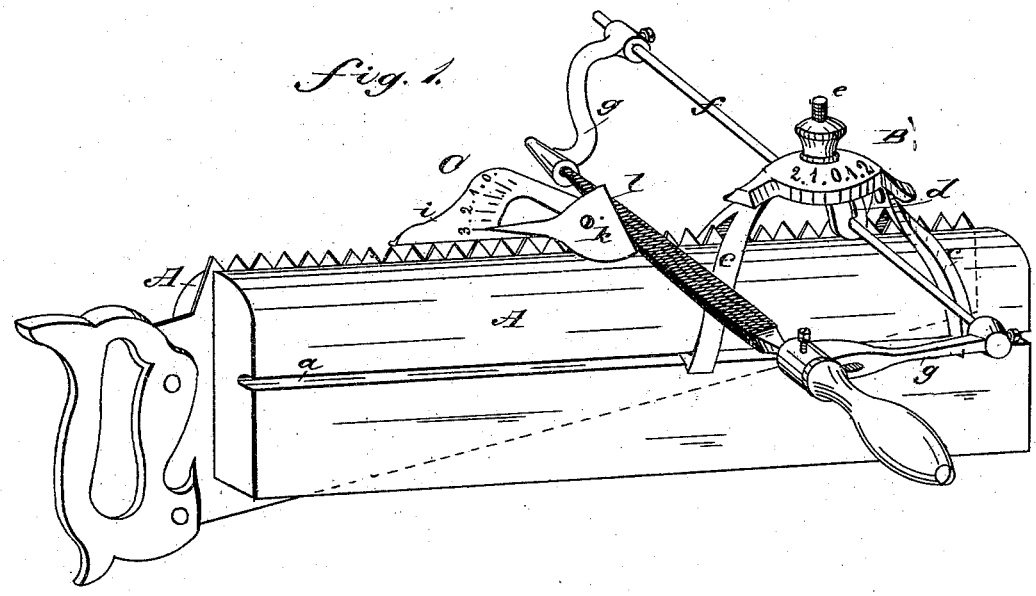
Figure 2:
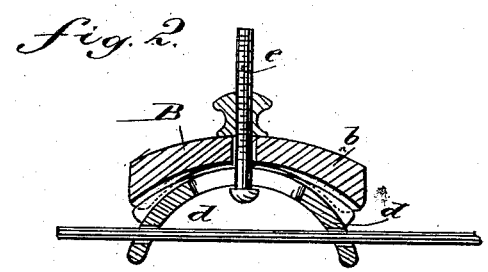
Figure 3:
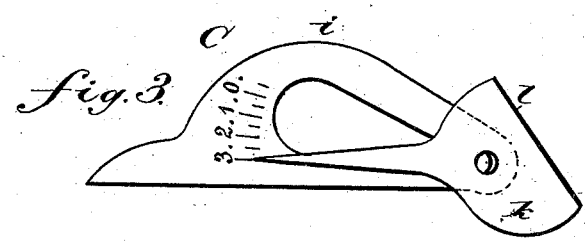

Figure 1 is a perspective view of my saw-filing machine, showing the same as applied to a saw. Fig. 2 is a cross-section of the clamp-head that carries the file-frame, and Fig. 3 is a side view of the gage by which the file is adjusted.

A A are the clamps between which the saw is placed and held as usual. These clamps are formed each with a longitudinal groove, $a$.

B is a clamp for carrying the file-frame, which consists of a head or plate, $b$, that is provided with legs or flanges $c$, that take into the grooves $a$ of the clamps A, so that the clamp B may slide freely lengthwise of the saw, about which there is nothing new, the same being shown in the before-named patent. At the under side of the plate $b$ is a semicircular or arc-shaped piece, $d$, held in place by a screw, $e$, and thumb-nut, the screw passing through a slot in the piece $d$, so as to allow of its lateral and vertical adjustment. The ends of this piece $d$ are apertured and receive the slide-rod $f$ of the file-frame. This file-frame is formed by arms $g$ upon the ends of the rod $f$, which arms are adjustable, and are formed at their outer ends to receive the ends of the files, as shown. It will be seen that with the file held in the frame in this manner and the guide-rod $f$ being held in the clamp B, the file is free to be moved endwise and across the teeth of the saw, and that the file may also be swung upward from the saw-teeth upon the rod $f$ as a center. The piece $d$ is formed with ribs, which take into grooves formed on the under side of the plate $b$, and the bearing or point of contact with the piece $d$ is at the outer edges of the top plate, so as to secure the greatest amount of friction and the firm holding of the piece $d$. By setting the piece $d$ to the right or left the angle of the file with reference to the teeth is varied. This is important, because all saws have their teeth set or bent, one to the right and the other to the left, and in order to file teeth so that their cutting-edges shall be in the proper direction the file must be set to the left while filing one half of the teeth and to the right for filing the other side. These changes can be readily made by loosening the thumb-nut upon the plate $b$, and to facilitate the accurate adjustment of the file the plate is provided on its upper side with a scale of figures to indicate the angle.

The pitch given to the teeth is of course dependent upon the angle of the filing-surface to a vertical line. This is varied by adjustment of the file in the file-frame, and to facilitate this adjustment and insure accuracy I provide the gage C, as shown in Figs. 1 and 3. This gage consists in a plate, $i$, formed with a straight edge to rest upon the points of the saw-teeth, to which plate is pivoted a pointer or plate, K, that is formed with a straight edge at $l$. By turning the pivoted plate K the angle of the edge $l$ is varied with reference to the straight edge of the plate $i$, and I provide upon the plate $i$ a scale of numbers to facilitate accurate adjustment. The gage C being placed upon the saw-teeth, as shown in Fig. 1, and the plate or pointer K properly adjusted, the file is to be adjusted to correspond with the edge $l$, which will give the proper pitch to the teeth. This may be done with either a three-cornered, a flat, or a half-round file, the file being secured in the frame by a set-screw or other means.

In using the apparatus the clamp B is moved upon the saw-clamps A so as to bring the file to the teeth in succession, and it will be seen that the proper filing of the saw can be readily carried out.

The lateral adjustment of the piece $d$ allowed by its slot varies the inclination of the file more or less to a horizontal. This adjustment is for the purpose of filing a greater bevel on the cutting-edge of the tooth than on the back of the tooth.

Having thus described my invention, I claim as new and desire to secure by Letters Patent—

1. In a saw-filing machine, the combination, with the clamping-head B, provided with the legs $c$, of the adjustable file-frame-holding piece $d$, substantially as shown and described.

2. In a saw-filing machine, the combination, with the clamping-head B, having its under surface grooved and provided with the legs $c$, of the ribbed file-holding piece $d$, adjustably secured to said head, substantially as herein shown and described.

3. In saw-filing machines, the combination of the curved piece $d$, the head or plate $b$, and clamping-screw $e$, substantially as shown and described.

4. In a saw filing machine, the gage C, consisting of the straight-edged and graduated plate $i$ and the pointer K, having the straight edge $l$ and pivoted to said plate $i$, substantially as herein shown and described.

ELIAS ROTH.

Witnesses:
GEORGE C. SHEELY,
JOHN F. BLAIR.